United States Patent [19]

Nakajima

[11] Patent Number: 4,563,680
[45] Date of Patent: Jan. 7, 1986

[54] DIGITAL RADIO PAGING RECEIVER

[75] Inventor: Takeshi Nakajima, Tokyo, Japan

[73] Assignee: Nippon Electric Co., Ltd., Tokyo, Japan

[21] Appl. No.: 460,962

[22] Filed: Jan. 25, 1983

[30] Foreign Application Priority Data

Jan. 27, 1982 [JP] Japan ................................. 57-12400

[51] Int. Cl.[4] ............................................ H04M 11/02
[52] U.S. Cl. ............................ 340/825.44; 340/311.1; 340/825.48; 179/2 EC; 455/31
[58] Field of Search ....................... 340/825.44, 825.39, 340/825.45, 825.46, 825.47, 825.48, 825.52, 311.1; 179/2 EC; 455/31, 343

[56] References Cited

U.S. PATENT DOCUMENTS

| | | | |
|---|---|---|---|
| 4,145,685 | 3/1979 | Stodolski | 455/343 X |
| 4,194,153 | 3/1980 | Masaki et al. | 340/825.44 X |
| 4,382,256 | 5/1983 | Nagata | 340/825.44 |
| 4,438,433 | 3/1984 | Smoot et al. | 340/825.44 |

Primary Examiner—Ulysses Weldon
Attorney, Agent, or Firm—Sughrue, Mion, Zinn, Macpeak & Seas

[57] ABSTRACT

A multi-address radio paging receiver having a plug-in PROM which stores only one of the receiver's address codes, the remaining address codes of the receiver being generated by an exclusive OR operation on ROM stored codes and the one PROM stored code. The PROM stored address code and the exclusive OR generated address codes are compared to a received calling signal. If a match exists an alert signal, peculiar to the particular address code detected, is generated. The address codes are BCH codes. All address codes for a receiver can thus be altered by reprogramming the PROM to store a different signal address code.

6 Claims, 41 Drawing Figures

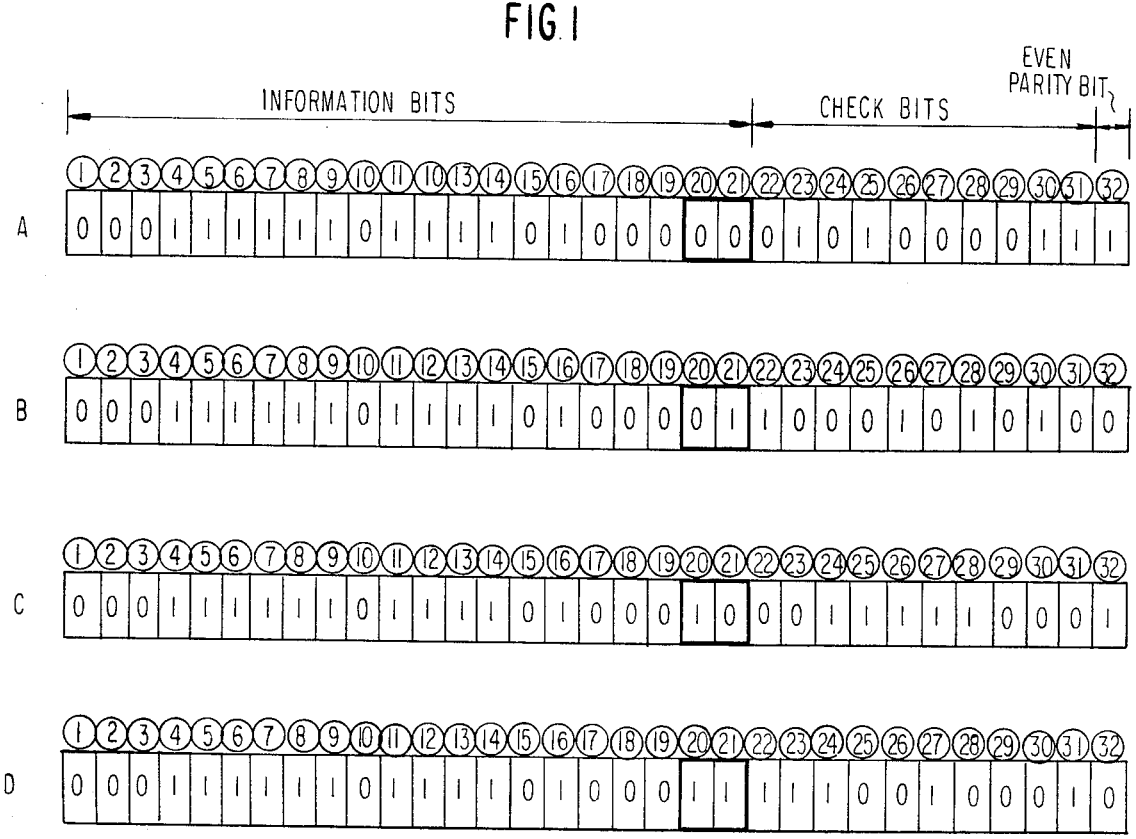
FIG. 1
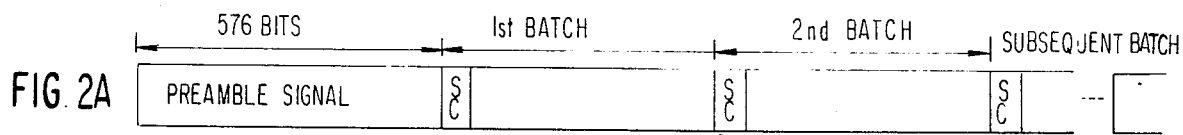
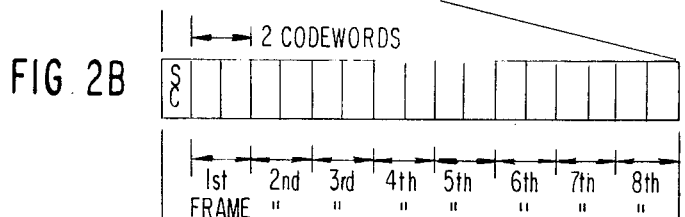
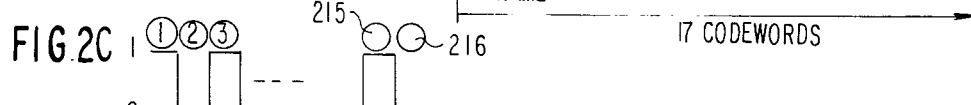
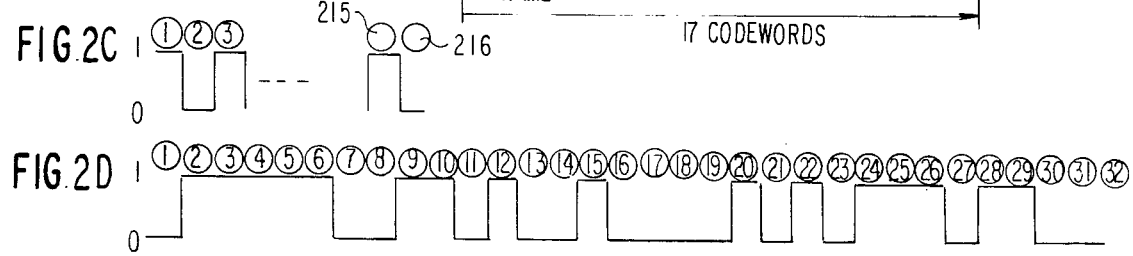

FIG. 3
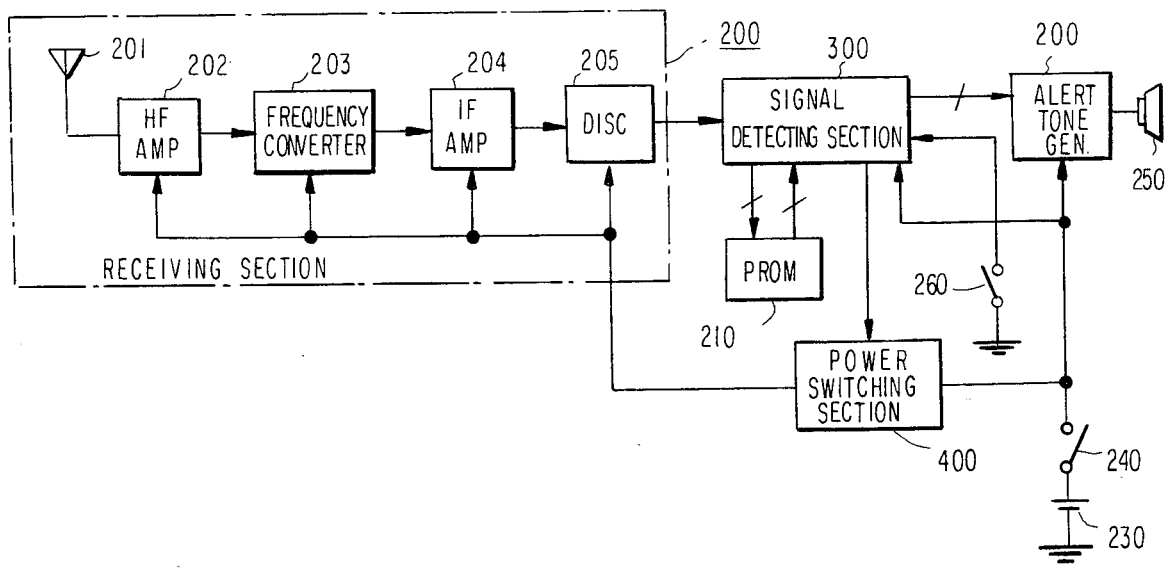
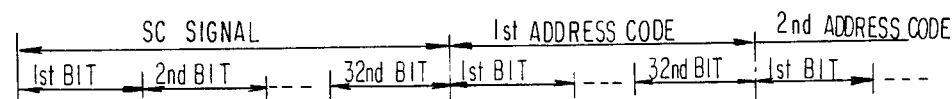
FIG. 6A  $g_1$ 
FIG. 6B  $g_2$ 
FIG. 6C  $g_3$ 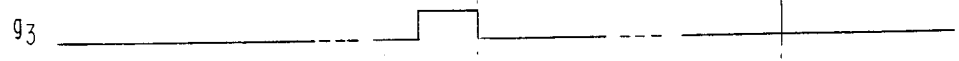
FIG. 6D  $g_4$ 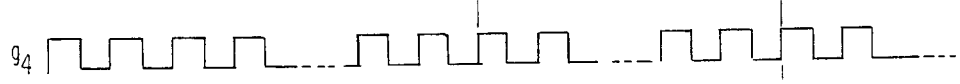
FIG. 6E  $g_5$ 
FIG. 6F  $g_6$ 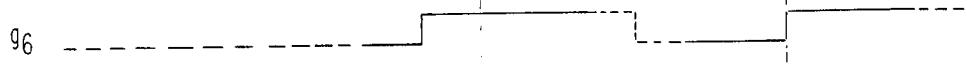
FIG. 6G  $g_7$ 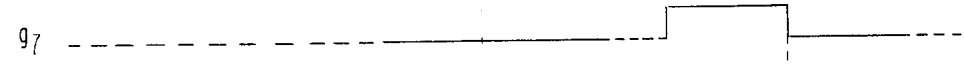
FIG. 6H  $g_8$ 
FIG. 6I  $g_9$ 
FIG. 6J  $g_{10}$ 

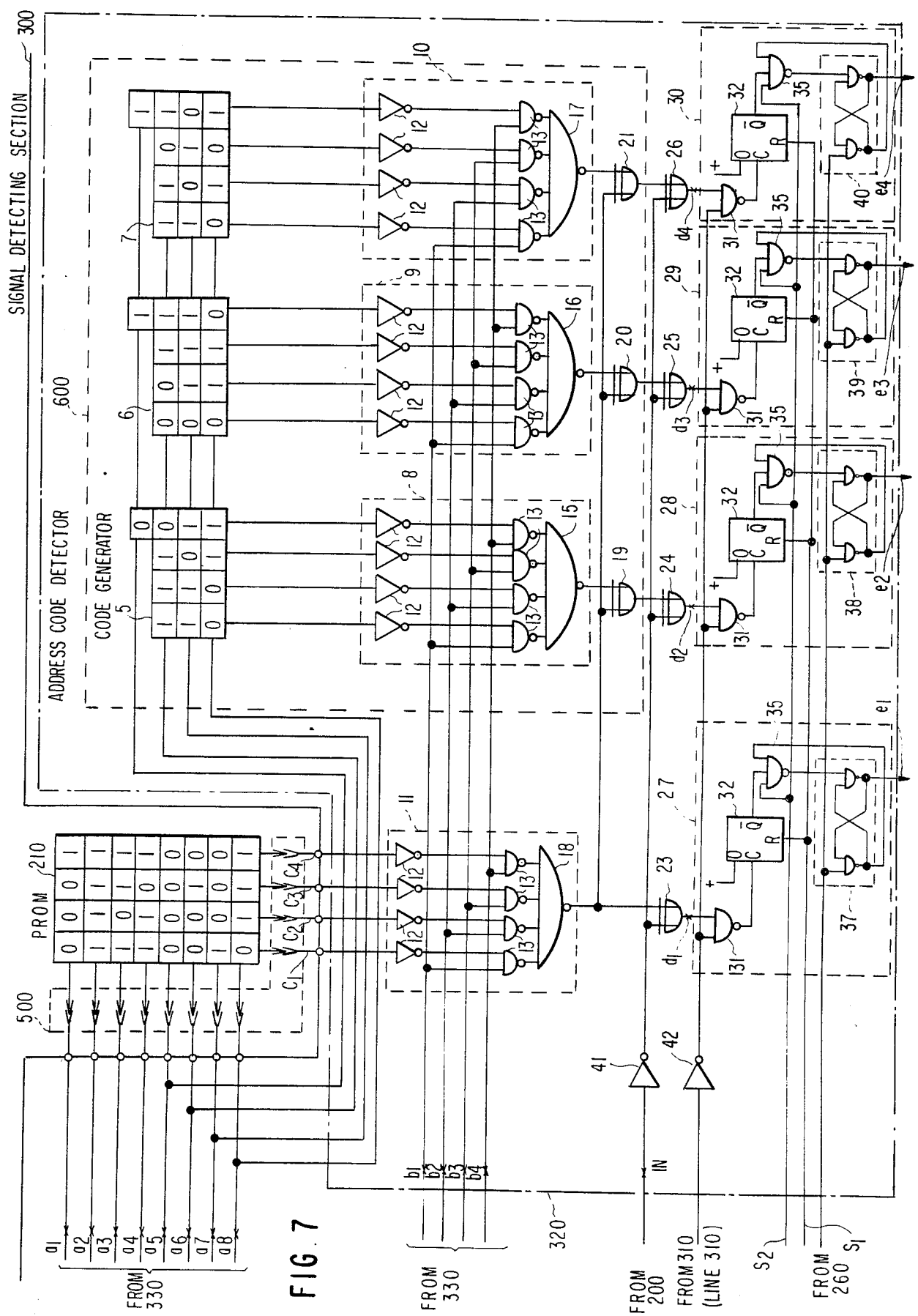

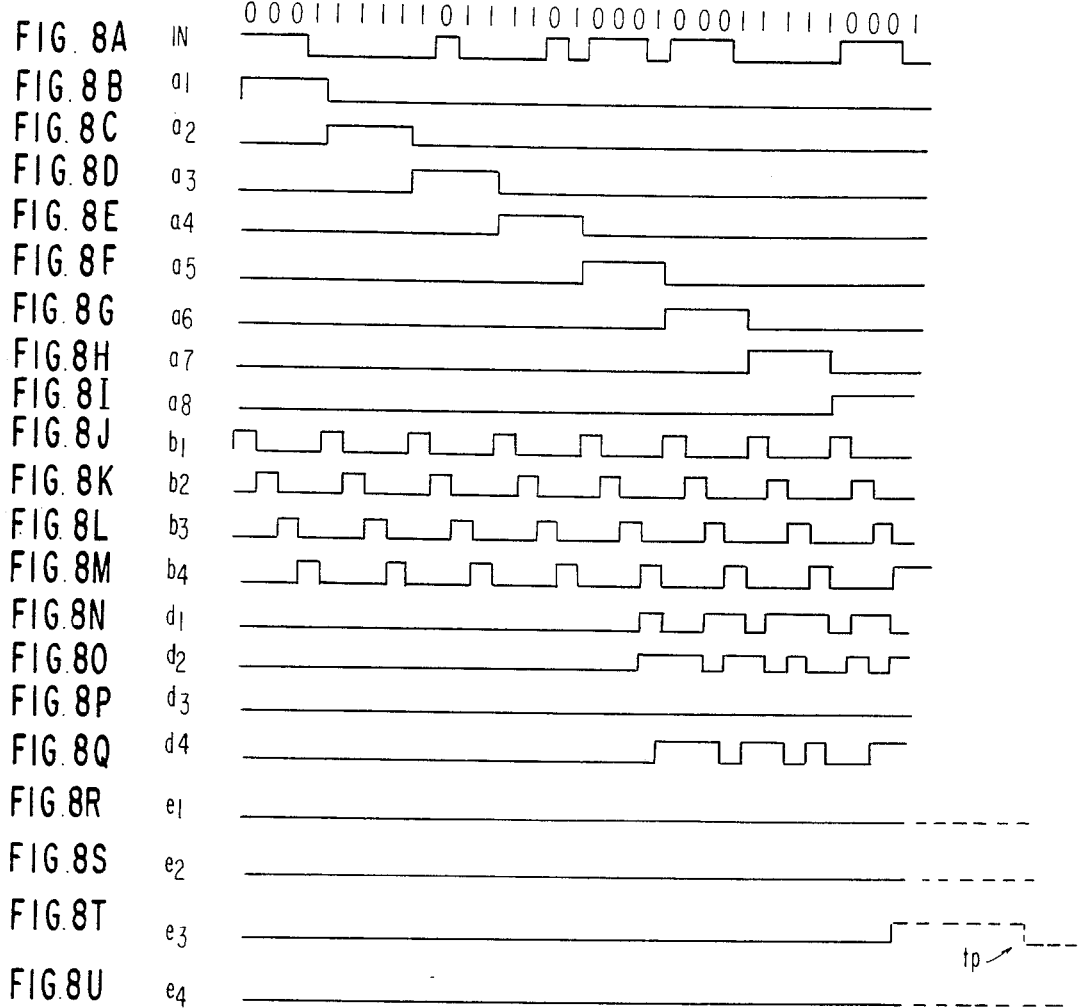

DIGITAL RADIO PAGING RECEIVER

BACKGROUND OF THE INVENTION

The present invention relates to a digital radio paging receiver and, more particularly, to the signal detecting circuit for such a radio paging receiver to which a plurality of address codewords are assigned.

In a conventional radio paging system, it is usual for any single radio paging receiver to be assigned a single address codeword. One such radio paging system is disclosed in the U.S. Pat. No. 4,194,153 entitled "Digital Radio Paging Communication System" granted to Masaru Masaki et al. Meanwhile, the so-called multi-address paging system, in which a plurality of address codewords are assigned to each radio paging receiver, has been proposed by the British Post Office. References on the latter include "A Standard Code for Radiopaging," published by the British Post Office in July 1979.

If it is attempted to receive with the aforementioned paging receiver of Masaki et al. any selective calling signal by the British Post Office-proposed multi-adddress paging system, the following inconveniences will arise. The capacity of the programmable read-only memory (PROM), which stores the assigned address codewords, and the shift registers, which detect the address codewords, must be increased. This increases circuit complexity and power consumption.

In a situation where the contents of the PROM have to be frequently altered, the PROM will be of the so-called cord plug type, which is mounted on a single-in-line package and plugged into a socket mounted on a printed circuit board (PCB). For a PROM of this cord plug type, an increase in address codewords would entail increases in both socket leads and PCB wires, making the miniaturization of the receiver more difficult.

SUMMARY OF THE INVENTION

One object of the present invention, therefore, is to provide a digital radio paging receiver capable of detecting multi-address codewords with a reduced PROM capacity and a reduced number of shift registers.

Another object of the present invention is to provide a digital radio paging receiver capable of detecting multiaddress codewords, made more compact by reducing the number of socket leads for the cord plug.

According to the present invention, there is provided a digital radio paging receiver comprising:

first memory circuit means for storing first address codeword assigned to said receiver and comprised of a BCH code;

second memory circuit means for storing a plurality of codewords, each comprising a BCH code whose information contents differ from said first address codeword only in a small number of specific bits;

code generating means for performing exclusive OR operation in a time series between the contents of said second memory circuit means and one of said first memory circuit means, respectively, and providing as its output second address codewords corresponding to said first address codeword; and means for time serially comparing a selective calling signal with said first and second address codewords to provide responsive to the results of comprison an identify signal representing the identity of said calling siganl with said address codewords.

BRIEF DESCRIPTION OF DRAWINGS

Other objects, features and advantages of the present invention will become more apparent from the detailed description hereunder taken in conjunction with the accompanying drawings, wherein:

FIG 1. shows the formats of four address codewords to be received by a paging receiver according to the present invention;

FIGS. 2A–2D show the transmitting format of a selective calling signal to be received by the paging receiver according to the present invention;

FIG. 3 is a schematic block diagram of the paging receiver according to the present invention;

FIGS. 6A to 6J are operating time charts of the circuits illustrated in FIG. 5;

FIG. 7 is a further detailed block diagram of the address codeword detector of the signal detecting section illustrated in FIG. 4;

FIGS. 8A to 8U are operating time charts of the circuit illustrated in FIG. 7; and FIG. 9 shows the formats of address codewords stored in the read-only memories (ROMs) referred to in FIG. 7.

DETAILED DESCRIPTION OF A PREFERRED EMBODIMENT

Figure 4:
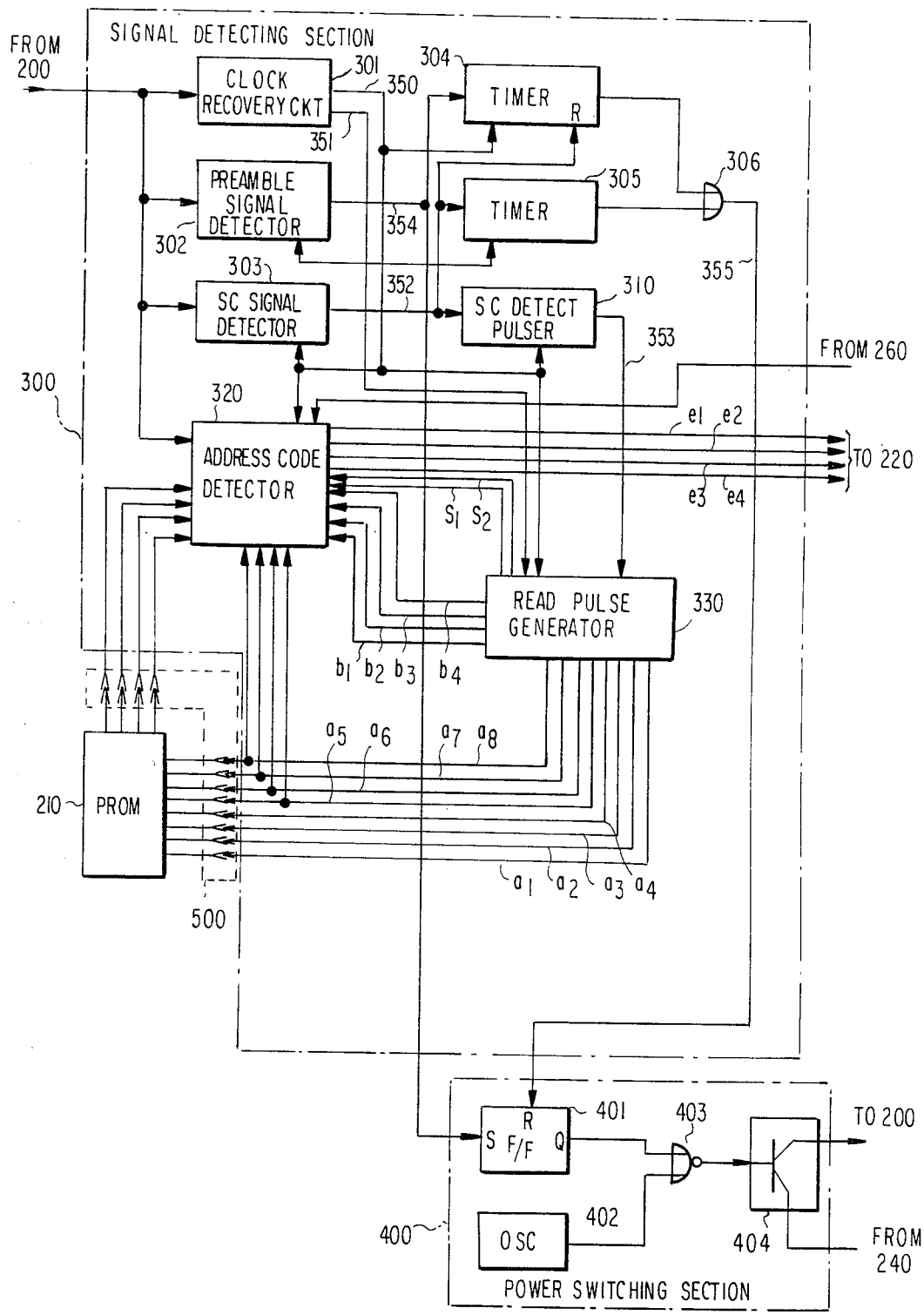
FIG 4 is a detailed block diagram of the signal detecting section and the power switching section in the receiver illustrated in FIG. 3.
Figure 5:
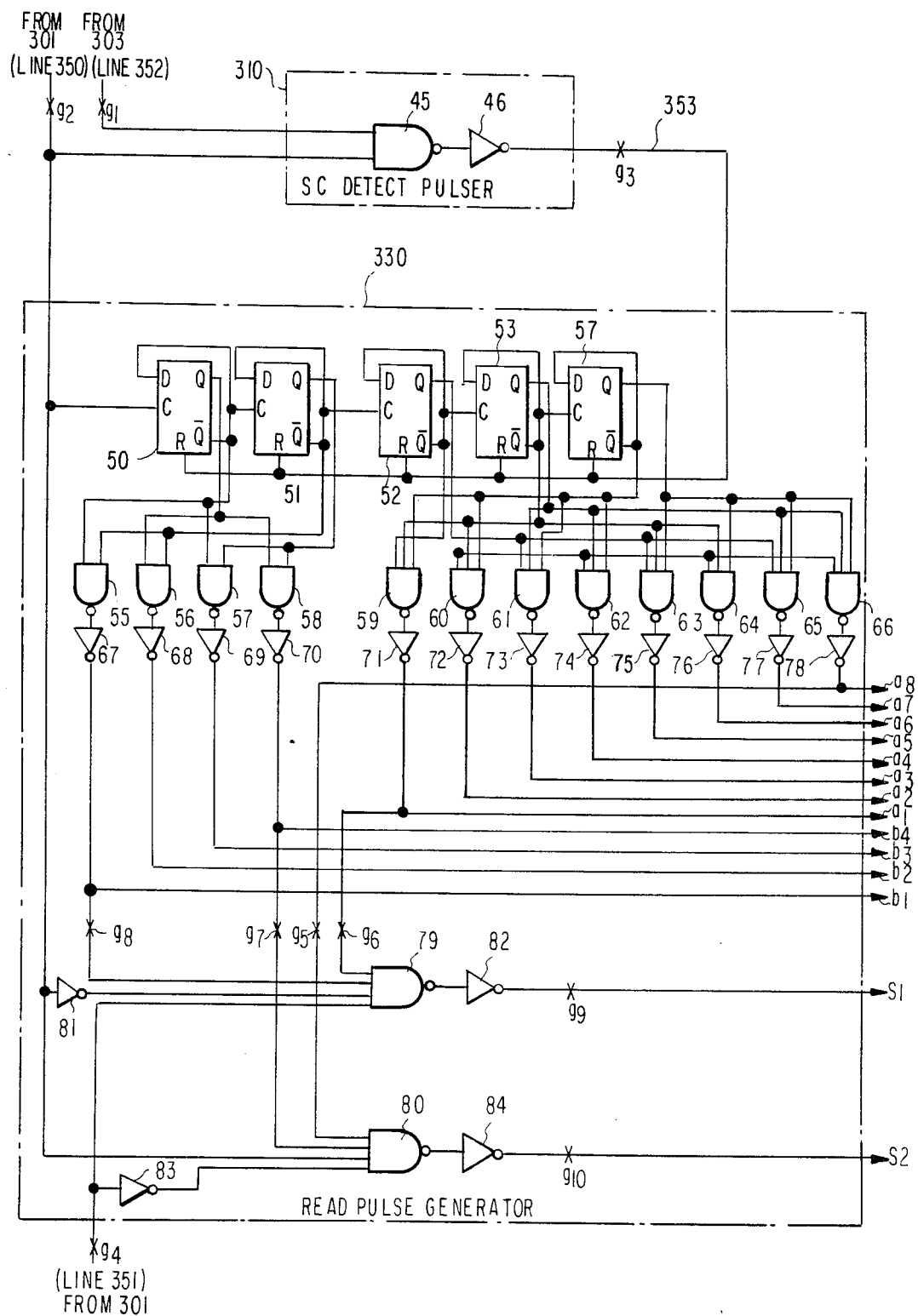
FIG. 5 is a further detailed block diagram of the synchronizing code (SC) signal detect pulser and the read pulse generator of the signal detecting section illustrated in FIG. 4.

Referring to FIG. 1, each address codeword is a Bose-Chaudhuri-Hocquenghem (BCH) code, comprising information bits, from the first through the 21st, and check bits, from the 22nd through the 31st, to which is added an even parity bit as the 32nd. Codewords A, B, C and D, having "00", "01", "10" and "11" as their 20th and 21st bits, respectively, constitute multi-address codewords.

In order to receive selective calling signals containing such multi-address codewords as those illustrated in FIG. 1, the paging receiver of Masaki et al. would require a PROM capacity of 32 bits×4=128 bits and an address codeword detector comprising four stages of 32-bit shift registers. If the PROM is a cord-plugged matrix type unit having 4×4 leads for the socket on the PCB, even if the address signal leads (eight) are common, a total of 24 output leads (4×4+8) will be needed.

Referring now to FIG. 2A, a selective calling signal transmitted from the base station of a paging system contains a 576-bit preamble signal and, following it, a plurality of 17-codeword batches. Each batch further includes a synchronizing codeword (SC) signal and, following it, eight two-codeword frames, or a total of 17 codewords, as shown in FIG. 2B. FIG. 2C illustrates the preamble signal, consisting of a repetition of "1" and "0". FIG. 2D shows an example of SC signals. Each frame in each batch comprises one or another of the address codewords shown in FIG. 1.

With reference to FIG. 3, an antenna 201 picks up a carrier wave which is frequency-shift-keying modulated with the selective calling signal shown in FIG. 2A, and supplies it to a high-frequency amplifier 202 for pre-amplification. The amplified signal is frequency-converted into an intermediate frequency (IF) signal by a frequency converter 203 including a mixer and a local excillator. A discriminator 205 demodulates the IF signal from the converter 203, amplified by an IF amplifier 204, into a digital signal. These circuits are well known ones in the art, and collectively called a receiving section 200 herein. For the battery saving function, the receiving section 200, when waiting for a call, is intermittently supplied with electric power from a battery 230 by way of a power switching section 400.

The demodulated digital signal is supplied to a signal detecting section 300. If a preamble signal is detected therein, the power switching section 400 will be driven for a predetermined duration required for SC signal detection, during which power is supplied from the battery 230 to the receiving section 200. Thus, the battery saving function is temporarily suspended. If an SC signal is detected by the detecting section 300 during this period, the battery saving function is further suspended. Next, the selective calling signal is compared with an output signal from a PROM 210, and if they are identical to each other, an alert tone generator 220 will be driven to emit an alert tone from a loud speaker 250. A switch 260 is provided to stop the operation of the alert tone generator 220. If the signal detecting section 300 fails to detect an SC signal ("no" is detected twice in this particular example), the power switching section 400 will resume its battery saving action to intermittently supply power to the receiving section 200.

Referring to FIG. 4, a preamble signal detector 302, upon detection of the preamble signal (FIG. 2A) from the output of the receiving section 200 (FIG. 3), supplies a detection pulse on a line 354, and sets a flipflop 401 in the power switching section 400 to close a transistor switch 404. The battery saving function is thereby suspended. Also in response to the detection pulse, a timer 304 is started. The timer 304 has a timer period $T_1$ longer than the combined duration of one preamble signal length, which is 576 bits, and one SC signal length, 32 bits. If no SC signal (FIG. 2C) is detected by an SC signal detector 303 within the timer period $T_1$, a pulse to reset the flipflop 401 is supplied from a NOR gate 306 by way of a line 355, and the receiver returns to its battery saving mode.

On the other hand, if an SC signal is detected by the SC signal detector 303 within the timer period $T_1$, a detection pulse is supplied on a line 352 to reset the timer 304 and at the same time to start another timer 305. The timer period $T_2$ of the timer 305 is longer than the length of time required for transmitting two batches, so that at least two SC signals can be detected (See FIG. 2A). The timer period $T_2$ is renewed every time an SC signal is detected. Unless the SC signal is not detected at least twice consecutively within the timer period $T_2$, a pulse to reset the flipflop 401 is supplied from the NOR gate 306 via the line 355, and the receiver returns to its battery saving mode.

The detection pulse supplied to the line 352 within the timer period $T_2$ when an SC signal is detected is waveform-shaped by an SC detect pulser 310 and, as a synchronizing pulse, supplied by way of a line 353 to a read pulse generator 330 to initialize it. The initialized read pulse generator 330 supplies the PROM 210 with PROM address signals $a_1$ to $a_8$ synchronized with the synchronizing pulse, and at the same time supplies an address code detector 320 with timing pulses $b_1$ to $b_4$. The pulse generator 330 also supplies $s_1$ and $s_2$ to the detector 320. Address codewords $c_1$ to $c_4$ read out in response to the address signals $a_1$ to $a_8$ enter the address code detector 320, in which they are compared with a received selective calling signal from the receiving section 200. If the received selective calling signal is, for instance, the address codeword of FIG. 1C, the address code detector 320 supplies a detection signal $e_3$ to the alert tone generator 220, which has the loud speaker 250 emit an alert tone corresponding to the detection signal $e_3$. If the selective calling signal is the address codeword of A, B or D in FIG. 1, the code detector 320 supplies a detection signal $e_1$, $e_2$ or $e_4$, respectively, and the tone generator 220 has a correspondingly different tone generated.

The address code detector 320 receives from the read pulse generator 330 the address signals $a_5$ to $a_8$ and the pulses $s_1$ and $s_2$, which will be explained in detail below. A clock recovery circuit 301, which extracts from the received selective calling signal a clock synchronized therewith and supplies a clock of a desired speed to each circuit by way of a line 350 or 351, is a well known device in the art. Reference numeral 500 represents a socket for the PROM 210.

Now will be described in detail the SC detect pulser 310 and the read pulse generator 330 with reference to FIGS. 5 and 6A to 6J. FIGS. 6A to 6J show waveforms at the "x" marks in FIG. 5. Upon detection of an SC signal, the SC signal detector 303 generates on the line 352 a detection pulse $g_1$ at the 32nd bit of the SC signal as shown in FIG. 6A. The SC signal detector 303 can be similar to the preamble signal detector disclosed in the aforementioned U.S. patent of Masaki et al. The SC detect pulser 310 includes a two-input NAND gate 45 and an inverter 46, and to its gate 45 are supplied the detect pulse $g_1$ and a clock pulse $g_2$ (FIG. 6B) from the clock recovery circuit 301 (FIG. 4). From the inverter 46 is supplied a shaped pulse $g_3$ (FIG. 6C), by which delay type (D-type) flipflops 50 to 54 are reset, and afterwards the clock pulse $g_2$ is frequency-divided to generate the address signals $a_1$ to $a_8$ and the timing pulses $b_1$ to $b_4$ by way of a circuit combining NAND gates 55 to 66 and inverters 67 to 78.

Whereas the address signals $a_8$ and $a_1$ and the timing pulses $b_4$ and $b_1$, in particular, are shown in FIGS. 6E to 6H as pulses $g_5$ to $g_8$, respectively, the pulses $g_6$ and $g_8$ are suppled to a NAND gate 79 and the pulses $g_5$ and $g_7$, to another NAND gate 80. To the NAND gate 79 are also supplied the product of inversion of the clock pulse $g_2$ by an inverter 81 and a pulse $g_4$ (FIG. 6D), having a frequency twice as high as that of the clock pulse $g_2$, from the clock recovery circuit 301. Similarly, to the NAND gate 80 are supplied the clock pulse $g_2$ and the product of inversion of the pulse $g_4$. To the output of the NAND gate 79 is coupled an inverter 82, giving as its output a pulse $g_9$ shown in FIG. 6I, which is supplied as the pulse $s_1$, to be described below, to the address code detector 320. From an inverter 84, coupled to the output of the NAND gate 80, is given as its output a pulse $g_{10}$ shown in FIG. 6J, which is suppled as the pulse $s_2$, to be also described below, to the address code detector 320.

Reference is made next to FIGS. 7 and 8A to 8U to describe in detail the operation of the address code detector 320. FIGS. 8A to 8U are time charts illustrating waveforms at the "x" marks in FIG. 7. To the PROM 210 are supplied the address signals $a_1$ to $a_8$ for reading out the contents thereof. These address signals are generated by the read pulse generator 330 illustrated in FIG. 5. Out of these address signals, $a_5$ to $a_8$ are also supplied to ROMs 5 to 7 in a code generator 600, and the ouptuts of these ROMs 5 to 7 and of the external PROM 210 are supplied to read-out circuits 8 to 11, respectively. Thus the content read out of each is supplied, by way of an inverter 12, to one of the input terminals of each of NAND circuits 13. To the other input terminal of each NAND circuit 13 is supplied a corresponding one of the timing pulses $b_1$ to $b_4$, which are generated by the read pulse generator 330 illustrated in FIG. 5.

The outputs of these NAND circuits 13 are supplied to the input terminals of four-input NAND circuits 15 to 18. The outputs of the NAND circuits 15 to 17 are supplied to one of the input terminals of each corresponding one of exclusive OR circuits 19 to 21, to whose other input terminal is supplied the output of the NAND circuit 18. The outputs of NAND circuit 18 and exclusive OR circuits 19 to 21 are supplied to one of the input terminals of each corresponding one of exclusive OR circuits 23 to 26, to whose other input terminals is supplied an input signal IN from the receiving section 200 by way of an inverter 41.

FIG. 8A illustrates a case in which the input signal IN is the address codeword C shown in FIG. 1. Description below is an instance where, the circuitry according to the present invention being used, the receiver's own address codewords are the selective calling codes A, B, C and D illustrated in FIG. 1.

First, address codewords E, F and G, of which all the first 19 bits are "0" and the 20th and 21st bits are "01", "10" and "11", respectively, as shown in FIG. 9, are prepared and stored in the ROMs 5 to 7. However, in the example shown in FIG. 7 where a negative logic is used, the first 19 bits are all at a high level, and accordingly this portion is not referred to. Here, because of the nature of BCH codes that the exclusive OR of any BCH codes also is a BCH code, the following equations hold:

$$B = A \cdot E + \bar{A} \cdot \bar{E} \quad (1)$$

$$C = A \cdot F + \bar{A} \cdot \bar{F} \quad (2)$$

$$D = A \cdot G + \bar{A} \cdot \bar{G} \quad (3)$$

Though the even parity bit is not contained in any of these BCH codes, these Equations (1) to (3) still hold.

In the external PROM 210 is stored the address codeword A. In this state, by the address signals $a_1$ to $a_8$ are read out the address codewords A, E, F and G stored in the external PROM 210 and the ROMs 5 to 7, respectively. These address codewords A, E, F and G so read out are given, in response to the timing pulses $b_1$ to $b_4$, bit by bit to the exclusive OR circuits 19 to 21, where the processes according to the Equation (1) to (3) are performed, so that out of the code generator 600 are supplied the address codewords B, C and D. Whether these address codewords B, C and D from the code generator 600 are identical with the input signal IN (the address codeword C in this particular example) is determined by the exclusive OR circuits 23 to 26. If they are, a low level or, if they are not, a high level will be supplied as their outputs, the output signals being such as $d_1$ to $d_4$ in FIGS. 8N to 8Q. The pulse $d_3$ indicates that the received selective calling signal is in bit-by-bit coincidence with the codeword C. A latching circuit 20 latches this pulse $d_3$, and gives a high level to its output $e_3$ (FIG. 8T).

Latching circuits 27 to 30 are the same circuits, whose D-type flipflops 32 are preset by the signal $s_1$, and the outputs $\bar{Q}$ of these flipflops are high levels. The clock pulse $g_2$ (FIG. 6B) on the line 350, inverted by an inverter 42, and the pulses $d_1$ to $d_4$ are respectively supplied to NAND gates 31 whose output in turn is supplied to the clock terminals of the D-type flipflops 32. When the inverted clock pulse and the pulses $d_1$ to $d_4$ are not identical, the outputs $\bar{Q}$ of the flipflops 32 are inverted. Thus, when they are identical, $\bar{Q}$ output will be a high level, and when they are not, it will be a low level.

Next, the detect read pulse $s_2$ becomes a high level in the latter half of the 32nd bit as shown in FIG. 6J, and the $\bar{Q}$ outputs of the D-type flipflops 32 at that time are respectively latched by set-reset (SR) flipflops 37 to 40, by way of following NAND gates 33 to 36. The output waveforms $e_1$ to $e_4$ of the SR flipflops 37 to 40 are such as shown in FIG. 8. Thus the detect signal of the address code detector 320 is $e_3$, in this particular example. In FIG. 8T, $t_p$ represents a time at which the manual reset switch 260 (FIG. 3) is pushed to reset the SR flipflop 39 thereby to stop the alert tone.

The detect signals $e_1$ to $e_4$ are coupled to respectively corresponding oscillators in the alert tone generator 220 (FIG. 3), and cause the speaker 250 to emit four different kinds of alert tone.

In the manner described above, the receiver successively receives its own address codewords A, B, C and D as the input signal IN, checks them in the signal detecting section 300, and if any one of the output signals $e_1$, $e_2$, $e_3$ and $e_4$ is given as a signal at the high level which indicates identify, it is judged that this particular receiver is being called, and the loudspeaker will sound.

Although the hitherto described embodiment uses codewords each comprising a BCH code plus one even parity bit, the usable codewords are not limited to this format, but the present invention can as well be embodied by the use of codewords each comprising a BCH code alone or a BCH code plus one odd parity bit.

As is evident from FIGS. 4 or 7, twelve leads are sufficient for the PROM socket according to the present invention. The capacity of the PROM need not be greater than 32 bits, and no large number of shift registers are required for address codeword comparison. Since the present invention, as described above, permits a digital radio paging receiver having a plurality of address codewords to be composed of ROMs and logical circuits by utilizing the nature of BCH codes without requiring flipflops or shift registers, there are achieved such advantages as a smaller receiver size, easier mass production and less power consumption.

What is claimed is:

1. A multi-address digital radio paging receiver of the type adapted to detect the presence of multi-address codewords in a selective calling signal, said receiver comprising:

means for receiving said selective calling signal;

first memory circuit means for storing a first address codeword assigned to said receiver and comprised of a BCH code and providing the content thereof in response to the received selective calling signal, said BCH code constituting one of said multi-address codewords detectable by said receiver;

second memory circuit means for storing a plurality of codewords and providing the content thereof in response to the received selective calling signal, each of said plurality of codewords comprising a BCH code whose information contents differ from said first address codeword by such content that exclusive OR operation on said first address codeword and each of said plurality of stored codewords results in the other of said multi-address codewords;

code generating means responsive to said received selective calling signal for performing said exclusive OR operation to provide the other of said multi-address codewords; and means for comparing said received selective calling signal with said first codeword and the other of said multi-address codewords, respectively, to provide, if they are identical with each other, an identity signal and to thereby detect the presence of said multi-address codewords in said received selective calling signal.

2. A digital radio paging receiver, as claimed in claim 1, further comprising means for generating, in response to the output of said comparing means, different alert tones each corresponding to a different one of said first and second address codewords.

3. A digital radio receiver, as claimed in claim 2, wherein said receiving means comprises means for demodulating a carrier wave FSK-modulated with a modulating selective calling signal and supplying the demodulated output, as said received selective calling signal.

4. A digital radio paging receiver, as claimed in claim 1, wherein said first memory circuit means comprises a programmable read-only memory.

5. A digital radio paging receiver, as claimed in claim 4, wherein said second memory circuit means comprises read-only memories.

6. A digital radio paging receiver, as claimed in claim 1, wherein said selective calling signal includes at least a synchronizing codeword (SC) signal and a plurality of address codewords, and wherein said receiver further has an SC signal detecting means for detecting said synchronizing codeword signal in said received selective calling signal; SC detect pulser means for waveform-shaping the output of said SC signal detecting means; and read pulse generating means for generating in synchronization with the output of said SC detect pulser means, address signals, timing pulses and read-out pulses, said address signals reading out the contents of said first and second memory circuit means, said timing pulses synchronizing said code generating means with said selective calling signal, said read-out pulses reading out of said identity detecting means said identity signal.

* * * * *

UNITED STATES PATENT AND TRADEMARK OFFICE
CERTIFICATE OF CORRECTION

PATENT NO. : 4,563,680

DATED : January 7, 1986

INVENTOR(S) : Nakajima

It is certified that error appears in the above-identified patent and that said Letters Patent is hereby corrected as shown below:

Column 3, line 4, change "excillator" to --oscillator--.

Column 5, line 66, change "circuit 20" to --circuit 29--.

Signed and Sealed this

Fifth Day of August 1986

[SEAL]

Attest:

DONALD J. QUIGG

Attesting Officer

Commissioner of Patents and Trademarks